Sept. 23, 1947.   H. SCHÜTTE   2,427,927
VEHICLE SUSPENSION
Filed Jan. 28, 1938   3 Sheets-Sheet 1

INVENTOR
Hermann Schütte
BY
Richard E Marine
ATTORNEY

Sept. 23, 1947. H. SCHÜTTE 2,427,927
VEHICLE SUSPENSION
Filed Jan. 28, 1938 3 Sheets-Sheet 3

INVENTOR
Hermann Schütte
BY
Richard E Marine
ATTORNEY

Patented Sept. 23, 1947

2,427,927

UNITED STATES PATENT OFFICE 2,427,927

VEHICLE SUSPENSION

Hermann Schütte, Swissvale, Pa.

Application January 28, 1938, Serial No. 187,472

15 Claims. (Cl. 267—15)

This invention relates primarily to vehicle body suspension in which fluid under pressure is employed to serve wholly or in part for the cushioned support of the load upon the wheeled understructure, and more particularly to dynamostatic suspension systems employing the principle of reciprocal dynamic forces exchange between the different support units by free fluid intercourse, or equivalent means permitting transmission of the suspension reaction forces reciprocally throughout the system, adapted to yield interdependent, levelizing center-action suspension effects.

The invention resides in various improvements, for better overall efficiency and utility in the system as a whole, together with improvements of the support units, certain modifications thereof, and a method for planing the suspension for maximum operating efficiency and ride comfort.

Experience with dynamostatic suspension systems has revealed to me the great difficulties of producing a highly efficient cylinder and piston type device as originally disclosed in my Patent No. 2,013,994, and also the fact that a more precisely planed mode of operation must be adopted to attain the ultimate, maximum efficiency and utility, set as the principle object of this invention.

Since important basic advantages are derived from the fluid intercourse, representing the dynamic forces exchange, the proper co-ordination of a precise rate of fluid intercourse for a given static deflection characteristic of the individual suspension unit, I have found, is of the utmost importance to attain the desired dynamic suspension characteristic required for maximum ride comfort.

The suspension units shown in the accompanying drawings illustrate in a more or less diagrammatic way one basic form which has given excellent results in service and which is used therefore to exemplify the present invention without limiting myself thereto.

The introduction of thrustplates comprising a uniform center portion, with suitably shaped rim portions extending over the effective operating area of the orbicular flexible membrane members, constitutes an important innovation inasmuch as they not only furnish me convenient means to precisely determine the requisite static characteristic of the suspension unit, but at the same time enable me to devise and construct a suspension unit to yield predetermined, definite periodicity of the suspended load, independent of the fluid contents subject only to further regulation by varying the size of the orifice opening and the ratio of fluid contents inside and outside the suspension unit, with fluid of aperiodic elasticity employed as the operating medium. The ability of precisely predetermining all the complex operating results and properly coordinate same for any given condition is a basic departure of this invention over former methods with devices of this character where the periodicity was simply accepted as a function of the amount of fluid under compression.

With the fluid intercourse conduits and the associated orifice openings dimensioned large enough to prevent the building up of an appreciable pressure difference inside and out, the periodicity of the suspension unit becomes practically a constant, depending upon the shape of the thrustplates in connection with size, pitch and curvature of the orbicular flexible membranes employed. This novel operating principle constitutes one of the important features of this invention inasmuch as it renders me the desired, complete and definite control over the effective functioning of the suspension in operation, as compared with the hit and miss methods commonly relied upon heretofore.

Experience from systematically conducted research with dynamostatic suspension systems and devices has also revealed to me the desirability of fairly liberal amplitudes of the wheel strokes for obtaining maximum riding comfort. To combine such relatively long stroke movements with the required low ratio of reaction effect increases for intermediate movement intervals is another object of this invention. In the device shown to exemplify the invention, I meet the long stroke requirements by arranging in series a plurality of membrane members of comparatively large size to assure flexing angles of the membrane material within the practical limits of dependability and long life, and by arranging intermediate thrustplate equivalents between those membrane members not directly associated with the respective outside thrustplates, for balancing against each other all the support elements throughout the suspension unit.

For the reason that the progressively increasing and decreasing support reactions of my suspension units are based mainly upon equivalent support area increases and decreases within the effective operating zones of the orbicular membrane members, and on account of the further fact that circular area increase with the square of their actual diameter, I arrange the operating zones of the flexible membrane members a distance away from the center, beyond the periphery of a fixed central area, where the relative area changes with respect to like intervals become relatively less in comparison with operating zones nearer the center. The large total support area not only permit me to impart the desired, relatively soft cushioning effects with the least number of membrane members, and set up at the same time requisite impedance or damping effects due to the greater volumetric displacements, but they also lend themselves to more accurate graduations with respect to the prorata area changes relative to the stroke. While the fixed central area serves principally to support the fixed minimum share of load, called dead load, the flexible operating zones serve more particularly to take care of load variations and the cushioning of the wheel movements due to the uneven road contours.

In view of the fact that on the one hand the periodicity of the sprung masses in a vehicle is a function of the suspension softness, and that on the other hand human passengers react with the greatest sensitivity against vertical body movements of high acceleration and deceleration values, represented by high periodicities of the vehicle body, and whereas the passengers are comparatively immune against vertical body movements of lower periodicities, one other important object of this invention resides in the attainment of a periodicity below the sensitivity limits of the human passengers, for the promotion of what may be termed positive ride comfort.

The combination of a plurality of flexible membranes comprising orbicular operating zones above 30 square inches of total load sustaining area, I have found most effective and practical for the attainment of the desired low periodicities of less than 100 oscillations per minute to assure positive ride comfort.

In sequence of the afore-stated, this invention finally resolves into a concise method of pre-planning the effective dynamic characteristic of the suspension system by divising first a suspension unit of suitable static characteristic and then superimposing thereupon a dynamic characteristic by regulating the fluid contents inside and outside of said suspension unit and by regulating the rate of fluid intercourse from the inside to the outside with references to the stroke of the wheel associated with said suspension unit.

Another vital consideration in the make-up of an efficient vehicle suspension presents itself in the changing requirements of the dynamic suspension characteristic for various speeds at which the vehicle is intended to be operated. While it has long been common knowledge that for slow speed travel a soft suspension action affords greatest ride comfort and that for high vehicle speeds the suspension reaction must be comparatively stiff, the exact cause and nature of these requirements appear to have not been sufficiently investigated and understood heretofore to permit the evolving of a uniformly efficient suspension over a wide range of vehicle speeds, as is one of the objects of this invention.

Any abstract analysis of the suspension requirements for different vehicle speeds demands obviously first the consideration of the resisting mass action of the sprung weight of the vehicle body in relation to the impinging forces, represented by the unsprung weights of the wheels and axles hurled against the suspension.

Assuming the resistive mass reaction effects of the vehicle body increase in proportion to the square of the velocities at which a wheel approaches the body in its upward movement after meeting with a road obstruction, and that the impinging forces of the wheel and axle weights moving upward against the suspension unit increase with the square of the velocities at which the wheel moves against the body, it follows that the reaction of the interposed suspension unit, for absorbing the impact energy of the wheel and axle and transmission to the body, must respond at a similar varying ratio to the speeds under which the forces are delivered to the suspension.

In the present invention the requisites pointed out are fully met by the proper proportioning of the effective cross section area of the fluid interchanging conduits and the associated orifice openings, namely by being made large enough to permit comparatively large volume of fluid interchange for the maintenance or instant reestablishment of a nearly even pressure level throughout the system in the face of any vertical wheel movements of a slow circle of oscillation, but not too large to induce decided choke effects as the wheel movements become faster, due to higher vehicle speeds.

In this manner a condition is created whereby for slow speed travel each wheel becomes cushioned against the total amount of air in the system, while at higher speeds each suspension unit begins to operate more or less independently on its own volume of fluid contents, so that the suspension reaction is greatly increased and stiffened up in proportion to the increase of speed at which the vehicle is operated.

Still other basic advantages are gained in the present invention from such comparatively large cross-section fluid conduits without introducing any additional mechanical complications. The transfer of relatively large volumes of fluid in consequence thereof, not only represents distribution of equivalent large stabilizing forces but they also impart to the system essential, strong impedance and damping effects. Furthermore, such liberally dimensioned conduits become not only highly beneficial and instrumental for checking pitching and rolling of the vehicle body on account of the transfer of strong counter forces to opposite suspension points, but they serve also in preventing the objectionable overlapping and compounding of dynamic preloading effects with new impact effects, such as found particularly disturbing when road obstructions are simultaneously struck by both front and rear wheels, as when crossing a railroad track for instance.

From the aforesaid it becomes quite apparent that the actual cross section of the fluid conduits is of utmost importance for the novel operating cycle employed in this invention.

For the purpose of immediately raising the pitch of the dynamic characteristic of the suspension independent of any increase of vehicle speed, a centrally located valve arrangement is provided for instant regulation of all the orifice openings, controlled manually from the drivers seat, or automatically, as deemed most desirable under the conditions. Since only a slight reduction of the orifice openings will instantly raise the periodicity of the suspended system, the conveniently operated valve constitutes an important adjunct for effectively breaking up harmonic body oscillations tending to result from synchronous road and speed conditions.

While it is evident that approximately similar results may be obtained with suspension units of somewhat modified nature, without departing from the principles of this invention, I am describing here, showing and illustrating in the accompanying drawings, in a more or less diagrammatic way, one basic form of the suspension units which has given excellent results in actual service for long periods of time.

These units embody in their principle makeup a gang of orbicular flexible membranes, resembling the sidewalls in pneumatic tires, made of flexible cord or tire material, or their equivalent, of sufficient mechanical strength to withstand the air pressure. The outer and inner edges of the flexible membranes are preferably provided with thickened flanges or beads for clamping to corresponding spacing rings, or, each two adjoining membranes webbed together on the outside to make a pair become integral—like the two sidewalls of a tire—and such pairs in turn joined by clamping to inner spacing rings, or, finally, the inner ends also webbed together in order to form all of the membranes into one single integral piece, with only the two end beads remaining free to be clamped to end-thrust-plates for closing the unit. The whole thus forming a bellows-like air chamber, capable of extending and contracting movements parallel to its axis, with a suitable inner lining or bag impervious to air or gases.

Considering for the sake of helpful analysis, bellows appearing at first examination very similar from a general point of view, but being made up of a number of flat diaphragm like members, it will be found, if such a device is pumped, that air may be drawn in or expelled through an opening at approximately a straight ratio, that is to say, for like distances of the pumping stroke, progressively measured, like amounts of air, or, in other terms, like cubical contents, will be displaced, thereby limiting the usefulness of the device greatly and make it impractical for the purpose of sustaining variably distributed loads in a freely intercommunicating system.

If on the other hand, the intervening flexible membrane members are orbicular or ring-cap shaped, and additionally, dish-shaped thrust plates are arranged to contact with the flexible membrane members, it is apparent that any desirable displacement and reaction characteristic may now be incorporated with the design of the device for better utility for the cycle of operation employed in this invention.

With a conventional steel spring suspension, the laws governing the period of oscillations of the suspended load require, that, in order to obtain the desirable low period, soft springs be employed having such high deflection rate that their initial deflection for sustaining the dead load becomes already unreasonably large.

If now to the dead load is added a passenger load, it is natural that the deflection of the springs is proportionally further increased, and if still more load is added to the outside springs while rounding curves, due to the leaning effect of the car caused by the centrifugal forces encountered, the spring deflection is still more accentuated to a intolerable condition.

To overcome such difficulties and to offer a more rational solution of these serious problems involved is one of the final objects of this invention.

To attain this ultimate object, I provide, in addition to expedient means for accurately adjusting the fluid pressure to precisely suit a given load, preferably a dual-ratio static suspension characteristic, embodying an extremely soft, centrally located, normal ride position zone, which gradually passes over into a much stiffer action zone on both sides to accommodate longer wheel strokes beyond the soft normal ride position zone.

Basically, such a suspension represents three separate and distinct zones of action, one of an extremely low natural period of oscillation for the middle portion of the stroke, which is the relatively normal ride position of the wheels with reference to the chassis, and a zone of much higher basic natural period of oscillation on either side, abridging the distances of unusually long compression or expansion stroke movements respectively. By adjusting the operating fluid to a pressure so that the normal static position of rest will be met approximately at the center of the soft, normal ride zone, it is seen that for small or limited wheel movements, as for instance when driving over a cobblestone road, the wheel movements will be entirely within the very soft zone of suspension reaction, and the result, an exceptionally smooth ride as governed by the extremely low basic natural period of oscillation. If, on the other hand, the road contour demands wheel movement of greater amplitudes, the suspension reaction increases more abruptly toward the end of the stroke, not only preventing the tendency of hitting through or bottoming, and preventing overtravel of wheels at the same time, but also breaking up the natural tendency of body oscillations, since during the complete cycle of a single stroke of a wheel movement the effects of two different basic periods are encountered. The resultant natural period being a comprise of the effects of the two basic periods in proportion to how much of the total amplitude of the entire wheel stroke lies in one or the other zone of suspension reaction or its corresponding periodicity of natural oscillation. The above analysis plainly proves that for each and every amplitude of wheel movement a basically different period of natural oscillation applies. This is an important feature for preventing the tendency of body oscillations.

The leaning of the body on curves, the tendency of which increases ordinarily with the degree of the suspension softness, I prefer to control by the location of the suspension units with relation to the center of gravity of the sprung masses. Designating the plane drawn through the upper thrust plates of all the suspension units as the "suspension level" I have discovered that the relative position of the center of gravity of the sprung masses with reference to the suspension level is principally responsible for the degree of leaning of the body of the vehicle while rounding curves.

Simple calculations show that at high speeds the centrifugal forces set up on curves of even fairly large radii become a very serious menace to the safety of the vehicle. Since the forces tending to roll over the vehicle body are of the nature, "centrifugal force at center of gravity multiplied by the leverage on which they act," it is clear that the most effective way of controlling such forces is by controlling the leverage component. For this reason I place my support units comparatively high above the axles so that the center of gravity of the sprung masses coincide with, or closely approximates the plan of the suspension level. For a reverse lean or cradle effect on curves I arrange the suspension level slightly above the center of gravity.

For anchoring the axles in definite fixed relation to the body of the vehicle I employ preferably a system of radius and tie-rods, designed to take up all brake or torque reaction forces as well as all lateral and horizontal forces coincident with the operation of the vehicle, but permitting entirely free up and down movements of the axles, so that merely the weight of the vehicle body and its load is to act upon the fluid pressure actuated support units.

The dynamic characteristic of the suspension I control preferably and most effectively by means of orifices arranged to permit a graduated, more or less restricted or unrestricted discharge and interexchange of operating fluid from any effected suspension into the remaining units or the associated system, the relation of the total volumetric contents of the individual suspension units with regard to the different relative operating positions, and finally by the total volumetric contents of fluid subject to compression in the entire system.

A valuable factor for more precisely governing, controlling or changing the dynamic characteristic of the suspension I have found to lie in the relation of the total volumetric contents of air in the individual support units, say at the static normal ride position, to the ratio at which the said cubical contents approaches zero on account of a compression stroke movement. An analytical analysis of this behavior, with the help of indicator diagrams taken from experimental and test units and the study of graphs plotted and developed for various conditions, have revealed to me the importance of the amount of dead space remaining after complete collapse of the suspension unit, or expressed in other terms, the amount of air remaining in any unit at the end of the compression stroke. On account of the adiabatic compression and expansion curve of the air employed as the suspension medium it becomes perfectly clear that the dead space becomes an important factor inasmuch as for instance in a hypothetical case, assuming a closed suspension unit with no dead space at all, the suspension reaction would rise to infinity upon a complete closing movement, whereas in case the dead space amounting to one half of the original cubical contents, the pressure inside the suspension unit will merely rise to double its original value and the suspension reaction in consequence thereof will not rise to anyway near infinitum as in the case cited first. Such analysis definitely proves that the dynamic suspension characteristic is almost as much a function of the dead space as of the size of the orifice permitting the air to escape.

I accomplish these various objects with a device, one exemplification of which being shown in the accompanying drawings and more fully described herein, including a plurality of suspension units interposed between the wheels and the chassis of the vehicle, arranged adjacent to one of said wheels each, respectively, with one of its thrust-plates joined to a wheel portion for free movement therewith, and the other, opposite thrust-plate mounted stationary to the frame or chassis of the vehicle. The said several suspension units being in turn all connected by means or fittings protruding from the stationary thrust plates and pipe or hose extensions therefrom, to a centrally located orifice controlling valve. Into the said valve body also enter connections from an air storage tank and the pressure supply means. The axles of the vehicle are being held in fixed relation to the chassis by a system of radius rods serving as brake and torque reaction members, and tie rods for absorbing all lateral and horizontal forces between the wheels and the chassis incident to the operation of the vehicle.

In a modified form of my invention, I employ as the operating medium, air at pressures below that of the atmospheric pressure in correspondingly modified suspension units mounted reversely in such manner that the difference between the degree of rarefication of the air in the system below that of atmospheric pressure is utilized to produce the suspension forces for sustaining the load. In other words, a degree of vacuum in the dynamostatic system being used in place of a fluid pressure charge to support the weight of the car body and its load.

By observing that it is now really not the vacuum but rather the higher pressure of the atmosphere surrounding the suspension units which actuates same in oppostie direction, as compared with the mode of operation if charged with fluid-pressure, it is quite apparent that in view of the operating forces now becoming effective in closing the suspension units, instead of extending same as formerly, it it evidently only necessary to mount the units in reverse fashion between the axles and chassis for obtaining similar operating results as those of the fluid pressure charged system.

Under reverse mounting I understand the mounting of the upper thrust plate of the suspension units to the upper face of the axles by means of suitable stay-bolts, and the lower thrust plate similarly to the lower face of the chassis, whereby the weight of the chassis tends to pull apart or separate the opposite thrust plates and the reaction force resulting from the vacuum becomes effective for closing the suspension units in their load sustaining action.

Proportioning of the suspension units to requisite size enables me thus to use the vacuum from the engine manifold as a convenient and efficient means to suspend the vehicle body through utilization of the normal suction action of the engine, commonly employed for propelling the vehicle, by providing suitable pipe connection between the engine manifold and the suspension system either directly, or, for better control, preferably by way of a suitable vacuum tank, and simple manually or automatically controlled valve arrangement in the said pipe connection for governing the degree of vacuum in proportion to the weights or loads to be suspended.

In another modified form of the present invention I employ in combination with my dynamostatic system mechanical suspension means of a conventional type, such as steel springs, or their equivalent, in such manner that the two separate effective suspension forces derived from the steel springs and the dynamostatic system respectively, act jointly in opposite directions, with the effect of the one, smaller force, acting in the same direction as the load and the other, larger force, reacting against the load, aided by the smaller force, for balancing same.

It is a well known fact that a conventional steel spring suspension is most efficient only for a small range of loads, while failing to serve satisfactorily for all other loads, and that it is impossible to change the characteristic of steel springs to properly meet changing load conditions with devices of the recoil-check and shock-absorber class. Experience shows further, that any steel spring suspension yields the best ride performance with a heavy load, or when the deflection of the spring is greatest.

From this it follows that the conventional spring suspended vehicle should be loaded to full capacity to obtain from it the best ride. Since, however, the majority of passenger automobile mileage is travelled with comparatively light passenger loads, it becomes obvious that with such steel spring suspension, the most efficient range of operation is rarely utilized and that there is a great need for basic improvements from this point of view.

With my dynamostatic system, in joint functional co-operation with a conventional steel spring suspension, the shortcomings referred to are quite easily, basically and completely overcome.

In the preferable form of this combination I arrange a frictionless coil spring suspension, in which, however, the individual springs are so dimensioned that the normal ride position would be reached only with a maximum capacity load, or even over capacity load, that is to say, the springs selected are of oversize load carrying capacity, but so proportioned as to yield an extremely low period of oscillation when deflected to normal ride position.

In addition, or parallel to, the said over capacity spring suspension I arrange my dynamostatic system of the vacuum operated type, only with the difference that the individual suspension units are mounted in the same manner as in the case of the pressure type suspension system. If, now, instead of charging the system with air pressure, a degree of vacuum is applied, it is evident that the vacuum will act to contract the dynamostat units, thereby adding to the weight effect of the vehicle body upon steel springs and for deflecting same to their normal ride position, by supplying the deficiency in load required to normally deflect the abnormally strong springs.

The supplementary load effect supplied in this manner by the dynamostatic system units represents really load without weight and may therefore appropriately be termed "synthetic load."

Since the value of the said synthetic load effect is governed on the one hand by the built-in characteristic of the system, to the rules given, and on the other hand is in proportion to the degree of vacuum applied, any deficiency or actual physical load may thus be supplied, through the application of a corresponding degree of vacuum to the dynamostatic system, in a definite predetermined manner or at a choosen rate.

The adding thus of a calibrated, predetermined supplementary force, representing a load effect, to the constant physical load, not only appears as a convenient means for controlling the deflection characteristic of the steel spring suspension, but in addition permits deflection of the springs always to exactly the best, normal ride position range of action, without the adding of weight.

The advantages of this modification of my suspension are entirely obvious for the reason that such combination permits complete control over the spring deflection characteristic and the basic period of oscillation for all loads and in addition represents an efficient means which will automatically compensate uneven physical loading and thereby keep the car body always on even keel so to speak, and prevent rolling, and leaning on curves, thereby permitting employment of extraordinary long springs most suitable for maximum ride comfort.

While in the previous paragraphs reference has been mainly relative to the static deflection characteristic, it is understood, of course, that the combined dynamic characteristic is altered likewise due to impressing a dynamostatic characteristic upon the steel spring suspension system. In fact, the superior, completely governed dynamic characteristic together with the drawing of the vacuum effect from the engine manifold for convenient manipulation to suit, is considered one of the main objects of advantage of this modified form of combination suspension.

The operating results of this combination suspension obviously conform in their main performance features for controlling the ride in almost every detail closely to that of the superimposed dynamostatic system for the reason that the reciprocal energy exchange balance taking place in the vacuum charge dynamostatic system is of practically the same nature as the overflow energy balance feature of the full dynamostatic pressure or vacuum type systems.

In the accompanying drawings, forming part of this specification,

Fig. 5 is an enlarged detail cross section view of a typical flexible membrane in its operative co-relation to a thrustplate in a suspension unit.

Figs. 6—7—8 are half cross section views of a typical four membrane suspension unit, showing the unit in its normal ride position, the totally extended position, and the totally collapsed position respectively.

Figs. 6a—7a—8a are diagrammatic views representing the effective supporting areas for the respective operating position.

Fig. 9 is a top plan view of a suspension unit.

Fig. 10 shows a four membrane suspension unit in which all membrane members are made integral.

Fig. 11 is a part cross-section view of a modified suspension unit for vacuum operation.

Figs. 12—13 are side and end views respectively showing the mounting of a vacuum type suspension unit.

Like numerals being used in the different figures to designate the same parts.

Referring to Figs. 1—2—3—4 of the drawings, 1 is the frame or chassis of a passenger automobile of usual type, with the body 2 supported upon the wheels 3 mounted upon axles 4. Interposed between the axles 4—4 and the chassis, adjacent, one each, to one of the wheels 3, are the suspension units 5—5—5—5. The upper thrust plates of said suspension units 5 are mounted stationary to the chassis, 1, while the lower thrust-plates of said suspension units in turn being clamped suitable to axles 4 for free up and down movement therewith. Radius rods 6, and tie member 7, mounted in rubber lined ball sockets 8, hold the axles 4 in fixed relation to chassis 1. The radius rods 6 are clamped to the axles by means of short spring clips 6' of sufficient rigidity to resist brake and torque reactions but capable of yielding slightly in response to the axle being thrown out of normal adjustment with regard to the plan of the fixed sockets 8. The purpose of this arrangement is to steady the car body somewhat against rolling, and thus permit the suspension to be designed extraordinarily soft and responsive for a perfect ride at slow period of oscillation.

Figure 4:
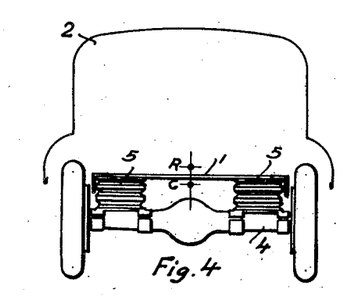
Fig. 4 represents a rear end view of the same.

The front axle, it will be observed, is shown located above the frame, instead of under as is common practice. This is for the dual purpose of lowering the center of gravity as much as possible on the one hand and for facilitating a high front end suspension level on the other hand. Since the dash and dotted line, drawn through the top thrust plates of the front and rear end suspension units, in Fig. 2, indicates the overall suspension level and the center of gravity of the sprung masses, as indicated about half way between front and rear axles, is at the point C, the relative position of center of gravity, a short distance below the suspension level, clearly proves the important advantages of this system of suspension mounting facilitated by a comparatively high front axle. In Fig. 4 center of gravity and roll center of the car body are indicated by the points C and R respectively on the center line. As R represents the mean height of the suspension level, and the center of gravity is found located a short distance below, it is apparent that the car suspended in this manner will have a tendency to lean inwardly on curves, that is to lean reverse to the direction of the centrifugal forces which being assumed to engage the car body at its center of gravity.

Figure 3:
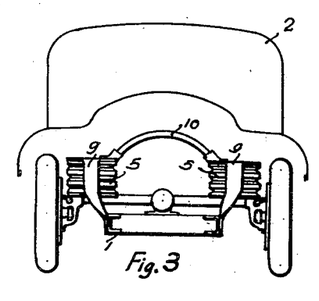
Fig. 3 is a front view of the same installation.

The tension straps 9 together with the cross connecting bar 10 indicated in Fig. 3 furnish me a convenient means for mounting the front end suspension units at almost any desired height to suit any desired relation of suspension level to center of gravity.

Figure 2:
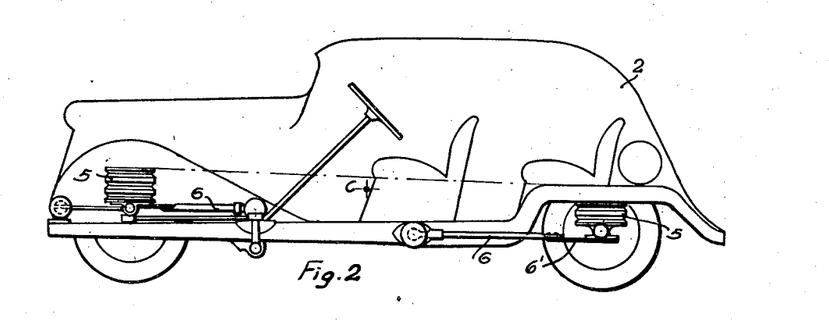
Fig. 2 is a side elevation of the car with two of the wheels removed for showing more clearly the mounting of the suspension units.

Referring to the steering mechanism as indicated in Fig. 2, it will be observed that the operating center of the steering drag link is located at approximately in line with the center of the radius rods holding the axle, whereby perfect steering geometry is assured since both rods are of the same length and move thru the same arcs.

Figure 1:
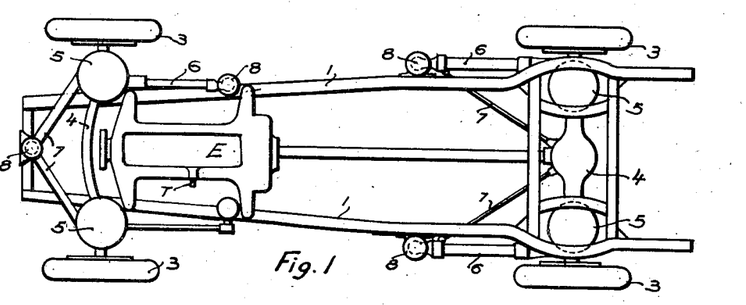
Fig. 1 is a plan view of a passenger automobile chassis with my suspension applied thereto.

The engine E in Fig. 1 is shown to be provided with a tap T emerging from its manifold. This is for the purpose of drawing from the engine a desired vacuum effect for operating the vacuum type suspension.

Figures 5, 6, 6A, 7, 7A, 8, 8A, 9, 10, 11, 12, 13:
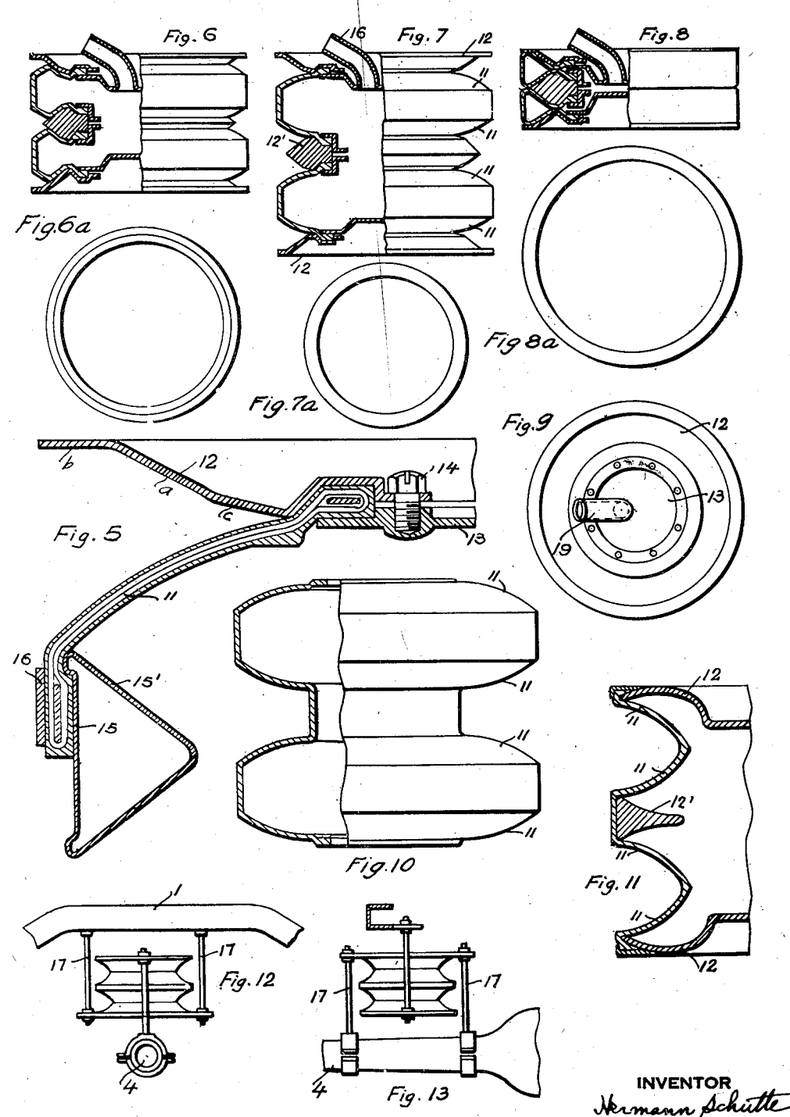

Referring to Fig. 5, giving a detail view of the co-relation of the principle parts of a suspension units, 11 represents a single flexible membrane provided with thickened beads on both ends for clamping to the center end-plate 13 with help of bolts 14 and thrustplate 12, and to the outside spacing ring 15 by means of the compression ring 16. The thrust plate 12 is shown formed so that the angle of contact with the flexible membrane varies at its different portions a, b, c. The three portions of different angularity indicate three different zones of area increase ratios with respect to the compression stroke movement and therefore represent the means for effecting different zones of suspension softness and the equivalent natural periods of oscillation of the sprung masses, as a function of the suspension characteristics.

Figs. 6, 7 and 8 are half cross-section views of the same suspension unit in three different operative positions. Fig. 6 being the middle or normal ride position, while Figs. 7—8 show the same unit in the totally extended and totally collapsed positions respectively. Fig. 7a shows the supporting areas applying to the totally extended unit or first zone.

The area inside the smaller circle represents the minimum supporting area of the unit, while the area between the inside and outside circles is the area increase and the proportion of the later with reference to the former represents the ratio of area increase for the entire first zone.

In Fig. 6a the inside and outside circles represents similarly the areas at the beginning and end of the middle zone of action while the dash and dotted circle encloses the area of the position in which the unit is shown. In Fig. 8a finally, the two circles indicate the supporting area at the beginning and end of this closing zone similar as in the previous two figures, a slight study of these figures in relation to the movements by which such area changes are occasioned easily reveals my method for producing any static suspension characteristic found most desirable.

Fig. 9 shows in a plan view prominently the outlet fitting protruding from the top end-plate of the unit which is attached directly to the fluid connection 19. Since the dynamic characteristic of the suspension is largely a function of the rate at which the fluid can escape out of a unit compressed by a upward wheel movement, I arrange the opening of sufficient size or cross section so that the unit will unload its surplus pressure during the culmination period of the stroke, that is to say, that the energy balance can take place or be established before the wheel has started appreciably on its return stroke. I have found it of utmost importance that the outlet opening is large enough to effect interchange of fluid and on the other hand the opening must not be too large to build up extra resistance, in the suspension unit, due to the choke effect of the restricted outflow opening, while the wheel is on a long upward stroke. To meet both of these conditions is, of course a very complex problem, and to give a concrete, complex example as to the actual requirements is beyond the scope of this specification.

Referring again specifically to Fig. 8, it will be noticed that special care has been taken to limit the dead space in the suspension unit when fully collapsed. In Fig. 5 a means is shown to reduce still further the dead space of a suspension unit by having portions 15' of spacing ring 15 projecting inwardly to occupy the remaining dead space indicated in Fig. 8. The member 12' most clearly shown at the middle portion of the suspension unit Fig. 7, may be considered a full equivalent of two opposite thrust plates arranged between two adjoining flexible membrane members.

Fig. 10 shows a casing in which all four membranes have been made integral out of tire material. Such one piece casing, when provided with an inside bag for holding the air, makes a very cheap and efficient device of great simplicity.

Fig. 11 illustrates in a portional cross section view a suspension unit modified for vacuum operation. Since the pressure is from the outside in in these units, the curvature of the membrane members, thrust plates and spacing members have been reversed, with all other features similar to the pressure type units.

A method of mounting the vacuum operated units is given in Figs. 12 and 13, where long stay-bolts 17 are shown employed for mounting the unit between the frame 1 and axle 4 to permit a contracting movement of the unit to furnish the forces for sustaining the load.

Figures 14, 15, 16, 17, 18, 19, 19A, 20:
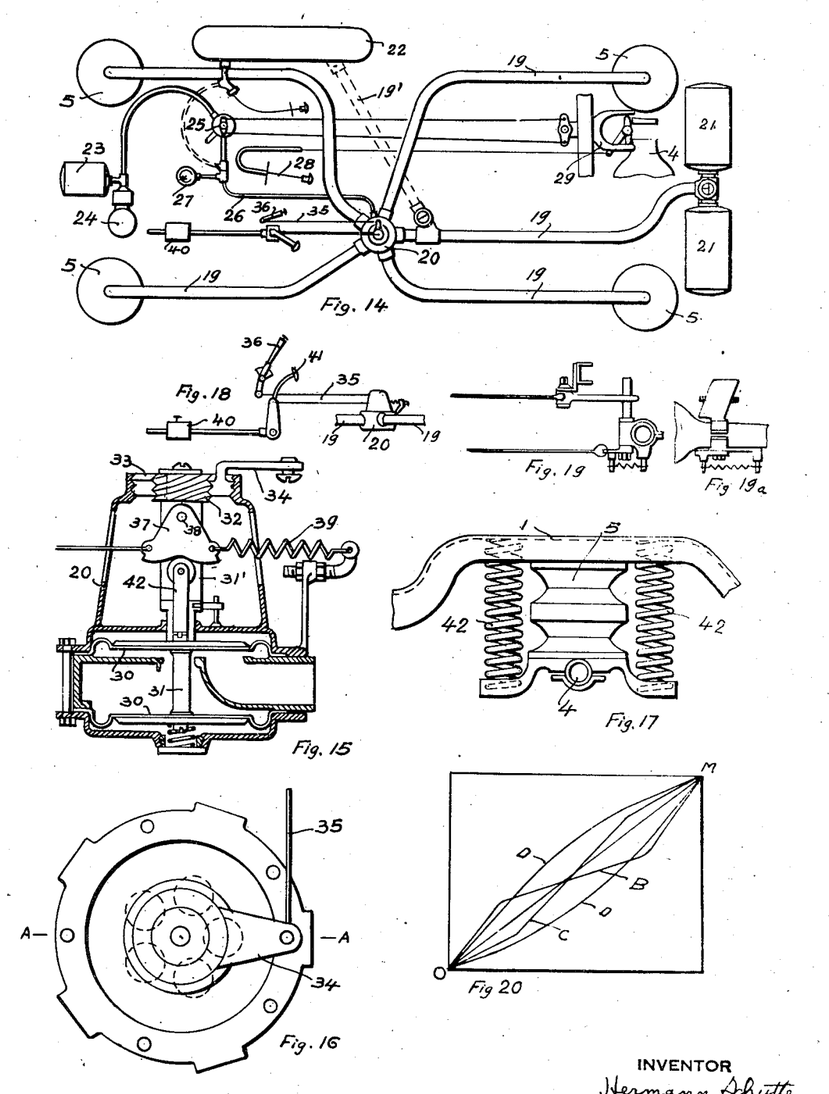
Fig. 14 is a replica of Fig. 1 showing all the essential parts of the suspension in their relation to each other.
Fig. 15 is a cross-section view of my orifice controlling valve.
Fig. 16 is a plan view of the valve indicating the operating lever.
Fig. 17 is a side view of vacuum type suspension unit in combination with steel springs.
Fig. 18 is a side view of the selective orifice control lever and periodicity check.
Fig. 19—19a are side end views respectively of automatic pressure control mechanism.
Fig. 20 are static suspension characteristic graphs.

Referring to Fig. 14, 5 again represents the suspension units and 19 the pipe or hose connections for connecting all the units to a orifice controlling valve 20. Storage tanks 21—21 are provided for augmenting the total amount of fluid under compression. A spare tire 22 carried in the tire hold of the car is also shown connected to the system through pipe 19' shown in dotted lines for the same purpose. The high pressure storage tank 23 or a pump 24 being provided to supply through a pressure reducing valve 25 and tube connections 26 air pressure to the system. The operating pressure is indicated by a gauge 27. Hand pull rod 28 serves to set valve 25 to furnish automatically the desired pressure by turning the parallelogram shaped guide-blade mounted on top of the rear axle 4 into operating position at right angle between the prongs of positioning fork 29, pivotally mounted to the chassis portion directly above, as shown in the plain view Fig. 14. The guide-blade is so dimensioned as to fit closed between the prongs of positioning fork 29, as shown in Fig. 19a, and the edges of the guide-blade are inclined from the vertical so that any relative vertical movement of the guide-blade with reference to the positioning fork will throw the fork into different relative angular positions with regard to its pivotal mounting from the normal position as shown in Fig. 19. The stem of the reducing valve 25 is in turn suitably responsively connected to the positioning fork 29 by means of a pair of pull rods or wires, or in some other suitable manner, so that any repositioning of fork 29 as effected by the blade arranged to move with the axle 4 will reset reducing valve 25 for automatically admitting the proper amount of fluid to build up the pressure in the suspension system commensurate to the prevailing load. Release of the pull rod 28 permits the guide-blade to return to its neutral position parallel to the prongs of fork 29 by means of properly arranged tension springs, as shown in detail in views represented by Figs. 19 and 19a, so that no further resetting of valve 25 can take place on account of operating movements of the axle 4 relatively to the chassis. This manually controlled setting at will of the reducing valve 25 for charging the suspension automatically with the suitable fluid pressure in proportion to the prevailing load, constitutes another important feature of this invention inasmuch as it furnished a convenient and efficient means of precisely controlling from the drivers seat the normal ride position of the chassis with reference to the axles, a feature of paramount importance in proportion to the greater degree of softness of the suspension units employed, to achieve maximum efficiency, with the suspension system of the present invention. Referring to Fig. 15 which is a cross section on lines A—A through the valve shown in plan view in Fig. 16, a pair of pressure balanced diaphragms 30—30 are clamped with their outer edges in the valve housing and mounted in the center to stem 31 for relative movements to and from orifice 19' representing in the valve the terminal points of pipe lines shown in dotted lines in Fig. 16 and 19. The upper part 31' of stem 31 carries on its top portion a collar 32, which is provided with a steep pitch, left hand male thread. Fitted to collar 32 is sleeve 33 by means of corresponding internal or female thread. The sleeve 33 has on its outside another equally steep-pitch, right hand thread which in turn serves to seat the sleeve rotatably in a correspondingly internal threaded portion in the neck of the valve body 20. Sleeve 33 carries also arm 34 by means of which, and the connecting rod 35 the sleeve may be rotated and the valve set from handle lever 36. Handle 36, being arranged within easy reach of the driver, this permits in a convenient manner the moving of the valve diaphragm with relation to the orifices, from a position of full opening to one of complete closing.

Since the dynamic characteristic of the suspension is largely a function of the size of the orifice permitting interexchange of air, the arrangement, and hand lever 36 in particular represents as important a much desired means of effective ride control. Another object of this arrangement resides in the possibility of entirely and tightly closing all orifices with one simple setting of the handle 36. This later feature I have found of quite equal importance as a means to readily discover any leak of pressure in the system. To test the installation against leaks it becomes only necessary to charge the entire system with air, then close valve 20 lightly and wait a short time and observe whether or not the pressure remains the same in all suspension units.

Referring again to Fig. 15 and valve 20, it will be noted that a cam 37 is shown mounted on pin 38 within the valve stem 31'. One side of cam 37 is yieldingly anchored by means of spring 39 to a solid projection from the valve body, while the other side is suitably connected to a pendulum weight 40, as shown in Fig. 18, in such manner that the tension of the spring will hold the weight in exact balance as shown. By sliding the weight along the supporting beam and changing the spring tension to correspond, the device can be made sympathetically responsive to any period of oscillation while remaining immune to all other periods of oscillation. If the device is adjusted to synchronize with the natural period of oscillation of the car body, it becomes evident that any repeated oscillating movement of the car upon which the pendulum is mounted will at once make the pendulum weight respond and pull cam 37 out of its neutral position with regard to valve stem 31' thereby pressing pin 42 against the upper diaphragm 30 and forcing the diaphragm in turn closer to the orifices of the valve.

Since now the dynamic characteristic of the suspension is a function of the size of the orifices, and the pendulum will change automatically the size of the orifice, it proves that the device may be used to prevent synchronized oscillating movement of the car. Attached to the synchronous pendulum I show foot pedal 41. Depressing this pedal will have therefore the same effect, namely to reduce the orifices and thereby change the natural period of oscillation of the suspended masses.

Referring to Fig. 17, a pair of springs 42—42 is shown alongside of suspension unit 5 of the vacuum operated type. The combined strength of the springs is slightly greater than the maximum load they are called upon to sustain. By charging suspension unit 5 with a degree of vacuum the deficiency of load to deflect the springs to normal ride position may thus be supplied by the dynamostat unit, and the car be maintained at all times in its normal ride position irrespective of the actual physical load. The regulation of the degree of vacuum required may be effected in practically the same way and with very similar means as described in connection with the pressure type system.

Referring to Fig. 20, the curves presented in the usual manner in a coordinate system, in which deflection is plotted, between the points O and M, zero to maximum, with reference to the load causing it, represent graphs of the static characteristic of the suspension as preferably employed in my dynamostatic system of suspension. These graphs also represent the static characteristic of suspension units, such as disclosed herein and forming an important part of this invention. In referring to these graphs may be pointed out yet for a better understanding that loads are represented by the ordinates, while deflections are given by the abcissa. Zero or initial load is considered the particular load under which the suspension unit becomes fully extended and the loads represented in the graphs therefore represent really only the load increases over and above said zero or initial load causing the suspension to compress or deflect from said fully extended position. The straight line curve represents the usual characteristic of a steel coil spring, while the S-curve B represents the 3 zone characteristic described more in detail in this specification. Curves C and D finally are modifications to which a suspension may be desired for some reason or in failure of attaining a greater perfection desired.

While I have set forth the object of my invention, giving the principles involved, and fully described preferred forms, with detail explanations, it will be understood that changes and modifications may be made in the forms disclosed herein, and that certain features may sometimes be used to advantage without corresponding use of other features, without departing from the scope of my invention.

I claim:

1. In a vehicle, the combination of an oversize steel spring suspension, with a vacuum actuated system comprising bellows-like suspension units of variable reaction characteristic with reference to the stroke, parallel to the said steel springs for applying any deficiency of physical load to deflect the said oversize springs to their best, normal ride position and compensate for any uneven loading, oppose body roll, body lean and body oscillations.

2. In a vehicle suspension, a plurality of fluid pressure actuated suspension units intercommunicatingly connected for free reciprocal interexchange of fluid between said suspension units, and means for augmenting the cubical contents of operating fluid under compression in the system from a spare tire.

3. In a vehicle, a plurality of bellows-like fluid pressure actuated suspension units interposed between the load supporting structure and the wheeled understructure, including manually set valve positioning means, acted upon by the relative position of the load supporting structure to the wheeled understructure, for admitting and regulating at will automatically fluid pressure to suit the load.

4. In a vehicle suspension a plurality of vacuum operated suspension units comprising flexible membranes, with coordinated means to impart in operation progressively increasing resistance for the approaching movements of the wheels toward the body, and means to regulate the rate of resistance increase, for the support of the vehicle body and its load.

5. In a vehicle, in combination with a spring suspension, a plurality of bellows-like chambered devices of variable reaction characteristic with reference to the wheel stroke, interposed between the load supporting structures and the wheeled understructure, said chambered devices being actuated by vacuum, connections between the engine manifold and the chambered devices for obtaining the vacuum to supply synthetic load effects for any deficiency of actual physical loads and for obtaining the synthetic load effect forces by the suction action of the engine.

6. In a vehicle, a plurality of fluid pressure actuated suspension units, the front axle of said vehicle being located above the body supporting frame to facilitate a relatively high front-end suspension level above the center of gravity of the front-end load, in combination with a rear axle below the body supporting frame to produce a rear-end suspension level below the center of gravity of the rear-end load.

7. In a vehicle, a dynamostatic suspension system, comprising a plurality of freely intercommunicatingly connected fluid pressure actuated suspension units of predeterminedly controlled static and dynamic characteristic, the front-end suspension units being mounted relatively high to the front-end sprung masses in relation to the lower mounting of the rear-end suspension units relative to the rear-end sprung masses, to produce a combined, overall suspension level near, at, or above the common center of gravity of the gross sprung masses.

8. In a vehicle suspension, bellows-like fluid pressure actuated suspension units, an associated fluid supply, and means to freely absorb and discharge fluid in operation from said associated fluid supply, said front-end suspension units being mounted relatively high with respect to the center of gravity of the front-end sprung masses, in comparison with the mounting of the rear-end suspension units to the center of gravity of the rear-end sprung masses, to produce a common, overall suspension level, near, at, or above the common center of gravity of the gross sprung masses.

9. In a vehicle suspension, a plurality of fluid pressure actuated suspension units, with means for augmenting the cubical contents of operating fluid from a spare tire.

10. In a vehicle, with a fluid pressure actuated suspension, the combination of a front axle above the body supporting frame, with a pair of radius rods anchored to the upper side of the frame, and steering rod located within close proximity of the radius rod level to assure efficient steering geometry.

11. A fluid suspension system for supporting the chassis on the wheel structure of a vehicle, comprising a fluid pressure-retaining suspension unit mounted adjacent each wheel unit, said suspension units expanding and contracting under varying loads transmitted between the chassis and the wheel structure, a single valve chamber, a fluid passageway connecting each suspension unit to said valve chamber, a single valve for regulating the degree of opening and for closing the passageways to said chamber, and means responsive to the vertical movement of said chassis for actuating said valve.

12. A fluid suspension system for supporting the chassis on the wheel structure of a vehicle, comprising a fluid pressure-retaining suspension unit mounted adjacent each wheel unit, said suspension units expanding and contracting under varying loads transmitted between the chassis and the wheel structure, a valve chamber, a fluid passageway connecting each suspension unit to said valve chamber, valvular means for closing and regulating the degree of opening of the passageways to said chamber, means responsive to the vertical movement of said chassis for actuating said valvular means, and manually controlled means independent of said last mentioned means for actuating said valvular means.

13. A fluid suspension system for supporting the chassis on the wheel structure of a vehicle, comprising a fluid pressure-retaining suspension unit mounted adjacent each wheel unit, said suspension units expanding and contracting under varying loads transmitted between the chassis and the wheel structure, a valve chamber, a fluid passageway connecting each suspension unit to said valve chamber, valvular means for closing and regulating the degree of opening of the passageways to said chamber, manually controlled means for adjusting the limit of the opening of said valvular means and means independent of said last mentioned means responsive to the vertical movement of said chassis for actuating said valvular means.

14. In a vehicle suspension unit, the combination of a compressible fluid pressure-retaining bulbous-chamber, a filler ring disposed within the bulbous-chamber and occupying a substantial portion of the volume of the dead space of the bulbous-chamber when the unit is completely contracted.

15. In a vehicle suspension unit, the combination of a compressible fluid pressure-retaining bulbous-chamber having axially opposed flexible walls, annular reacting plates arranged to engage opposed flexible walls to compress the bulbous-chamber, a filler ring disposed within the bulbous-chamber, and opposed annular surfaces on said plates arranged to co-act with said filler ring to substantially reduce the volume within the bulbous-chamber leaving a materially small dead space therein when the suspension unit is completely contracted.

HERMANN SCHÜTTE.

REFERENCES CITED

The following references are of record in the file of this patent:

UNITED STATES PATENTS

| Number | Name | Date |
|---|---|---|
| 1,177,142 | Rudd | Mar. 28, 1916 |
| 1,094,567 | Hofman | Apr. 28, 1914 |
| 1,816,075 | Down | July 28, 1931 |
| 1,618,036 | Wilson et al. | Feb. 15, 1927 |
| 1,502,209 | Peterson | July 22, 1924 |
| 1,915,649 | Devillers | June 27, 1933 |
| 1,133,337 | Tinkham | Mar. 30, 1915 |
| 1,130,656 | Annable | Mar. 2, 1915 |
| 2,023,135 | Hawkins | Dec. 3, 1935 |
| 2,133,279 | Brown | Oct. 18, 1938 |
| 2,115,159 | Dupuy et al. | Apr. 26, 1938 |
| 1,869,285 | Taber | July 26, 1932 |
| 1,153,602 | Chapin | Sept. 14, 1915 |

FOREIGN PATENTS

| Number | Country | Date |
|---|---|---|
| 300,856 | Great Britain | Nov. 22, 1928 |
| 743,192 | France | Jan. 6, 1933 |
| 425,937 | Great Britain | Mar. 25, 1935 |
| 428,664 | Great Britain | May 16, 1935 |
| 404,964 | Great Britain | Jan. 22, 1934 |
| 735,608 | France | Aug. 30, 1932 |